United States Patent
Malik

(10) Patent No.: US 9,599,269 B2
(45) Date of Patent: Mar. 21, 2017

(54) SPARSE 3D-MULTI-SCALE GRID TURBULENCE GENERATOR

(71) Applicant: Nadeem Ahmad Malik, London (GB)

(72) Inventor: Nadeem Ahmad Malik, London (GB)

( * ) Notice: Subject to any disclaimer, the term of this patent is extended or adjusted under 35 U.S.C. 154(b) by 86 days.

(21) Appl. No.: 14/710,531

(22) Filed: May 12, 2015

(65) Prior Publication Data

US 2016/0010778 A1    Jan. 14, 2016

Related U.S. Application Data

(60) Provisional application No. 62/022,630, filed on Jul. 9, 2014.

(51) Int. Cl.
*F16L 55/00* (2006.01)
*B01F 5/06* (2006.01)

(52) U.S. Cl.
CPC ............ *F16L 55/00* (2013.01); *B01F 5/0688* (2013.01)

(58) Field of Classification Search
USPC ...................................... 138/39, 42; 366/340
See application file for complete search history.

(56) References Cited

U.S. PATENT DOCUMENTS

| | | | |
|---|---|---|---|
| 2,664,109 A * | 12/1953 | Iager | F16L 55/02736 138/42 |
| 3,195,865 A | 7/1965 | Harder | |
| 3,361,412 A * | 1/1968 | Cole, III | B29B 7/325 138/42 |
| 3,545,492 A * | 12/1970 | Scheid, Jr. | F16L 55/02718 138/42 |
| 4,109,680 A * | 8/1978 | Lavender | B01D 63/082 137/599.11 |
| 5,354,460 A | 10/1994 | Kearney et al. | |
| 5,938,333 A | 8/1999 | Kearney | |
| 6,333,019 B1 | 12/2001 | Coppens | |

(Continued)

FOREIGN PATENT DOCUMENTS

EP    0 831 303 A2    3/1998

OTHER PUBLICATIONS

Mazzi, B., and J. C. Vassilicos. "Fractal-generated turbulence." Journal of Fluid Mechanics 502 (2004): 65-87.

(Continued)

*Primary Examiner* — James Hook
(74) *Attorney, Agent, or Firm* — Richard C. Litman

(57) ABSTRACT

The sparse 3D-multi-scale grid turbulence generator includes a set of turbulence generator elements, each having a set of fluid flow passages defined therethrough. Each successive one of the turbulence generator elements increases in number and decreases in scale of its respective set of fluid flow passages with respect to the previous one of the turbulence generator elements in a substantially multi-scale pattern. The set of turbulence generator elements is positioned within a fluid flow conduit, and each of the turbulence generator elements is spaced apart from adjacent ones of the turbulence generator elements in a multi-planar arrangement such that the turbulence generation in fluid flow optimizes some turbulence property and/or its effects with an improved effective grid blockage ratio. The turbulence generator elements are selectively positionally adjustable for active control of turbulence in response to varying conditions.

13 Claims, 4 Drawing Sheets

(56) References Cited

U.S. PATENT DOCUMENTS

| | | | |
|---|---|---|---|
| 6,616,327 B1 | 9/2003 | Kearney et al. | |
| 8,414,182 B2 | 4/2013 | Paul et al. | |
| 9,200,650 B2* | 12/2015 | Van Buskirk | F15D 1/025 |
| 2002/0196706 A1* | 12/2002 | Kearney | B01F 5/06 |
| | | | 366/336 |
| 2004/0213084 A1 | 10/2004 | Kearney | |
| 2010/0226202 A1* | 9/2010 | Vassilicos | B01F 5/0601 |
| | | | 366/336 |
| 2011/0002436 A1* | 1/2011 | Lu | G21C 3/322 |
| | | | 376/442 |
| 2011/0080802 A1 | 4/2011 | Vassilicos et al. | |
| 2012/0250814 A1* | 10/2012 | Choi | G21C 3/352 |
| | | | 376/442 |

OTHER PUBLICATIONS

Mazellier, N., L. Danaila, and B. Renou. "Multi-scale turbulence injector: a new tool to generate intense homogenous and isotropic turbulence for premixed combustion." Journal of Turbulence 11 (2010).

Mazellier, Nicolas, and J. C. Vassilicos. "Turbulence without Richardson-Kolmogorov cascade." Physics of Fluids (1994-present) 22.7 (2010): 075101.

Laizet, S., and J. C. Vassilicos. "Fractal space-scale unfolding mechanism for energy-efficient turbulent mixing." Physical Review E 86.4 (2012): 046302.

Laizet, S., and J. C. Vassilicos. "Stirring and scalar transfer by grid-generated turbulence in the presence of a mean scalar gradient." Journal of Fluid Mechanics 764 (2015): 52-75.

* cited by examiner

SPARSE 3D-MULTI-SCALE GRID TURBULENCE GENERATOR

CROSS-REFERENCE TO RELATED APPLICATION

This application claims the benefit of U.S. Provisional Patent Application Ser. No. 62/022,630, filed Jul. 9, 2014.

BACKGROUND OF THE INVENTION

1. Field of the Invention

The present invention relates to turbulence generators, and particularly to a sparse 3D-multi-scale grid turbulence generator for generating and controlling turbulence in a fluid flow conduit.

2. Description of the Related Art

A Vassilicos (or square fractal grid) fluid flow modification apparatus for creating turbulence in a moving fluid includes turbulence-creating elements arranged in a fractal configuration, each element having first and second surface portions against which the fluid can flow, and further includes an insert for arrangement to obstruct the flow of fluid between adjacent second surface portions of at least two turbulence-creating elements. A support holds the turbulence-creating elements in the fluid to allow movement of the fluid relative to the turbulence-creating elements and the insert. The insert can be attachable to at least two turbulence-creating elements, such that the arrangement of the inserts is symmetrical about a center point of the fluid flow field for improved mixing. The Vassilicos apparatus, however, does not typically optimize mixing within the fluid, and can lack control over where mixing takes place. Thus, a sparse 3D-multi-scale grid turbulence generator solving the aforementioned problems is desired.

SUMMARY OF THE INVENTION

The sparse 3D-multi-scale grid turbulence generator is a fluid modification apparatus for creating, generating, adjusting and/or controlling turbulence in a three-dimensional (3D), substantially multi-scale pattern or configuration, such as a substantially fractal pattern or configuration. Embodiments of the sparse three-dimensional (3D) multi-scale grid turbulence generator create turbulence in a fluid when the fluid is moving relative to the sparse 3D-multi-scale grid turbulence generator. The sparse 3D-multi-scale grid turbulence generator includes a set of turbulence generator elements in a substantially multi-planar arrangement, each having a set of fluid flow passages defined therethrough. Each successive one of the turbulence generator elements increases in number and decreases in scale of its respective set of fluid flow passages with respect to the previous one of the turbulence generator elements in a substantially multi-scale pattern or configuration, such as a substantially fractal pattern or configuration. It should be understood that the multi-scale arrangement does not necessarily have to be a true fractal pattern, and that any suitable pattern or progression of increasing number and decreasing scale of fluid flow passages formed through the progression of turbulence generator elements may be utilized. It should be further understood that, as used herein, the term "sparse" is used to mean that the system cannot be space-filling, in any sense, in a full 3D volume due to the substantial void spaces between the turbulence generator elements.

In use, the set of turbulence generator elements is positioned within a fluid flow conduit, and each of the turbulence generator elements is spaced apart from adjacent ones of the turbulence generator elements such that turbulence generation in fluid flow is optimized according to a desired goal or objective function. For example, the objective may be to maximize the turbulence at a set location downstream of the set of turbulence generator elements. In this example, to approximation, the turbulence patterns formed by each of the turbulence generator elements are in a state of superposition. The effective grid blockage ratio within the fluid flow conduit is thereby reduced when compared to conventional, non-sparse grid-type arrangements. It should be understood that herein, the term "non-sparse" is used to describe an arrangement of elements and passages that is not sparse, as defined above. It is important to note that the turbulence generator elements are preferably selectively positionally adjustable for active control of turbulence in response to varying conditions.

Embodiments of the 3D-multi-scale grid turbulence generator can be used to control and/or enhance and/or optimize the mixing of and/or the momentum transfer between: fluids, heat, mass, acoustic noise, oscillations in fluids, microchip cooling, structural vibrations, chemical species, reactants, contaminants and particulates suspended in the flow, and scalar, vector and tensor fields that can be coupled to the flow. Also, embodiments of the sparse 3D-multi-scale grid turbulence generator raise each element in space in the stream-wise direction, essentially in a substantially multi-planar configuration, such that each generation or level of elements is contained in its own frame parallel or substantially parallel to, and separated by, some distance from the frame containing the next generation of elements, such as at predetermined distances based on geometric, fluid dynamic, and objective function parameters. The arrangement of each generation of turbulence elements into separate planes reduces the effective grid blockage ratio $B_{eff}$ of the grid, and thus can improve overall performance when compared to that of a conventional non-sparse area-filling two-dimensional (2D) or a non-sparse space-filling three-dimensional (3D) grid arrangement.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
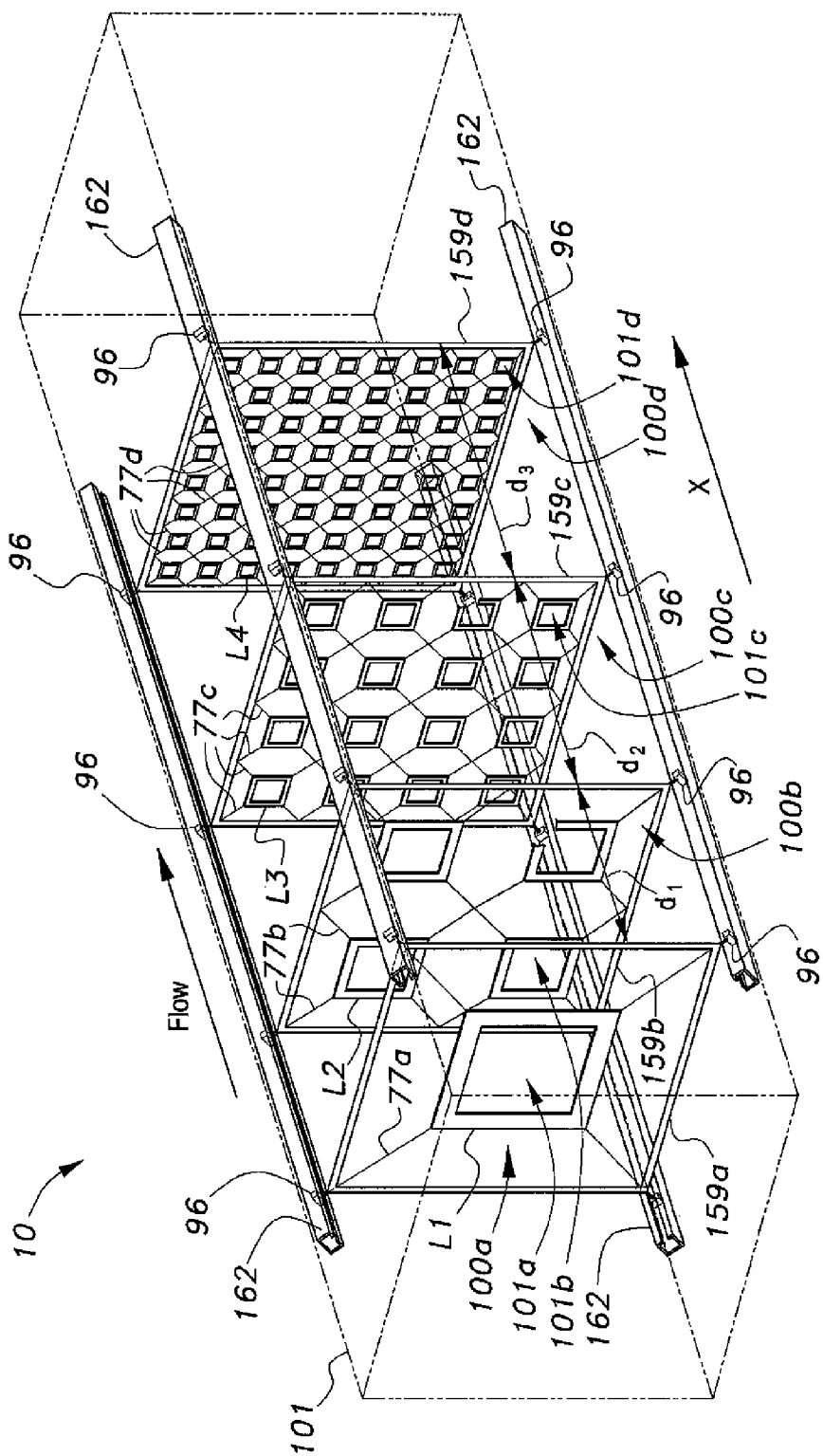
FIG. 1 is a perspective view of a sparse 3D-multi-scale grid turbulence generator according to the present invention.
Figure 2A:
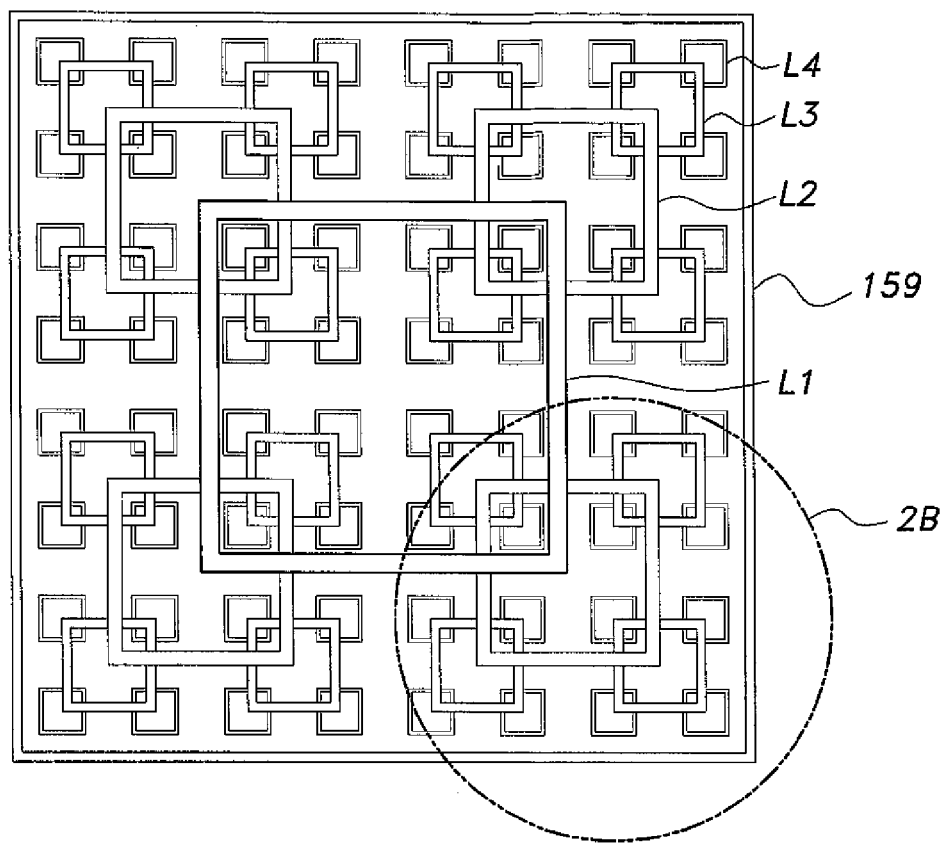
FIG. 2A is a front plan view of a plurality of grid elements of the sparse 3D-multi-scale grid turbulence generator of FIG. 1, shown in superposition.
Figure 2B:
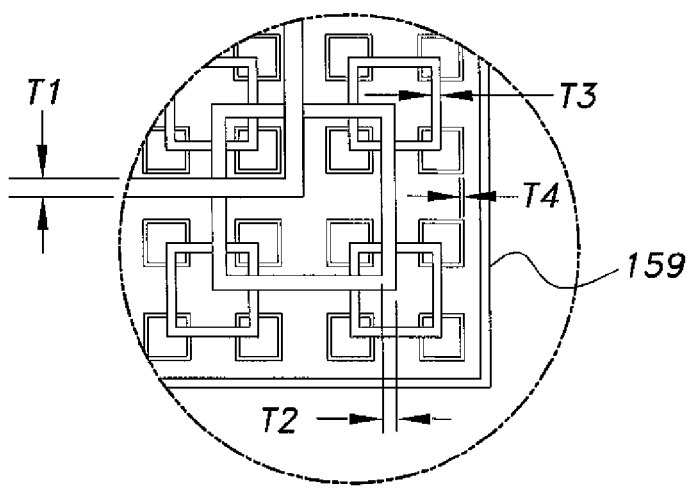
FIG. 2B is a detail view of area 2B of FIG. 2A, illustrating thickness versus scale dimensionality thereof.
Figure 3:
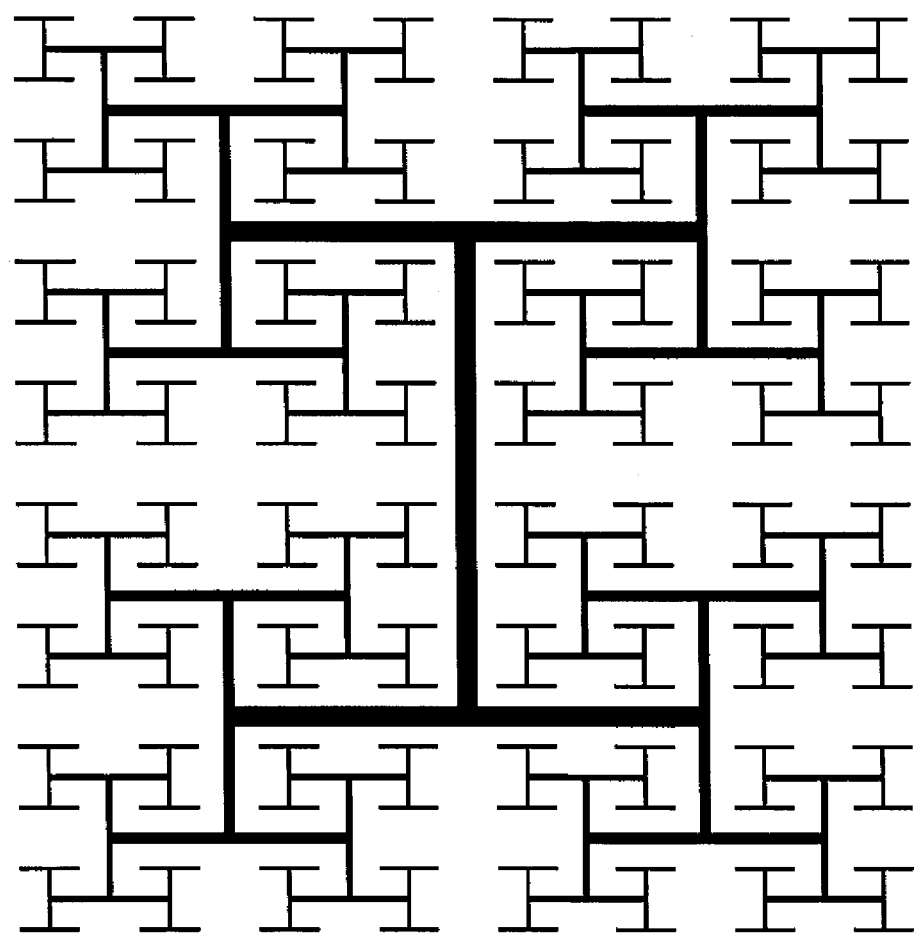
FIG. 3 is a front plan view of an alternative embodiment of a plurality of grid elements for a sparse 3D-multi-scale grid turbulence generator according to the present invention.

As shown in FIGS. 1-3, a sparse 3D-multi-scale grid turbulence generator 10 is a fluid modification apparatus for creating, generating, adjusting and/or controlling turbulence in three dimensions (3D). As shown in FIG. 1, embodiments of the sparse 3D-multi-scale grid turbulence generator 10 have a substantially multi-scale pattern or configuration, such as a substantially fractal pattern or configuration, including a plurality of substantially planar turbulence generator elements 100a, 100b, 100c, 100d disposed in a conduit 101 and arranged in a substantially multi-scale distribution (such as a substantially fractal distribution) in a substantially multi-planar configuration.

The turbulence generator elements 100a, 100b, 100c, 100d form a set of turbulence generator elements. The turbulence generator elements 100a, 100b, 100c, 100d each have a respective set of fluid flow passages defined therethrough, such as respectively formed by fluid flow passages 101a, 101b, 101c and 101d. Each set of the fluid flow passages 101a, 101b, 101c and 101d respectively includes at least one fluid flow passage, such as the one-member set of one fluid flow passage 101a, or includes a plurality of fluid flow passages, such as the respective sets of a plurality of fluid flow passages 101b, 101c and 101d, as illustrated in FIG. 1, for example. Each successive one of the turbulence generator elements 100a, 100b, 100c, 100d, as arranged in a direction of flow, indicated by an arrowed line "Flow" in FIG. 1, increases in number and decreases in scale of its respective set of fluid flow passages 101a, 101b, 101c and 101d with respect to the previous one of the turbulence generator elements, such as illustrated in FIG. 1, for example. It should, however, be understood that, alternatively, the turbulence generator elements may be arranged in any desired order or pattern. As will be discussed in further detail below, the turbulence generator elements are preferably selectively positionally adjustable for active control of turbulence in response to varying conditions.

Each respective generation or level L1, L2, L3, L4 of the turbulence generator elements 100a, 100b, 100c, 100d in the multi-scale grid is contained in its own respective holding frame 159a, 159b, 159c, 159d, as shown in FIG. 1. The frames 159a, 159b, 159c, 159d are attached to rails or channels 162 of the fluid conduit 101 via bearings 96, and can be secured thereto by any suitable method, such as sliding and locking into position along the rails or channels 162, being slotted into the rails or channels 162 at fixed locations, or the like, so that the frames 159a-159d can be adjustably positioned along the rails or channels 162. The frames 159a, 159b, 159c, 159d are separated from one another at predetermined distances based on geometric, fluid dynamic and objective function parameters, for example, depending on the use or application, and should not be construed in a limiting sense. It should be understood that the positioning of frames 159a, 159b, 159c, 159d may be adjusted with respect to the fluid flow channel by any suitable means. For example, the rails or channels 162 may be telescopic or otherwise adjustable, allowing the frames 159a, 159b, 159c, 159d to remain fixed to the rails 162, but allowing their positioning, and the respective distances therebetween, to be adjusted. Alternatively, the frames 159a, 159b, 159c, 159d may be positionally adjusted or translated with respect to the rails or channels 162; i.e., their positioning with respect to rails or channels 162 and with respect to one another may be selectively adjustable for active control of turbulence in response to varying conditions.

Within each of the frames 159a, 159b, 159c, 159d, the respective turbulence generator elements 100a, 100b, 100c, 100d are held in their planar arrangement by respective wire suspension members 77a, 77b, 77c, 77d, as shown in FIG. 1. The separation distances between frames 159a, 159b, 159c, 159d determine the distances $d_1$, $d_2$, $d_3$, as indicated in FIG. 1, between levels L1, L2, L3 and L4, where the distances $d_1$, $d_2$, $d_3$ are determined as a function of geometric, physical and objective function parameters, such as the length scale LS1, LS2, LS3, LS4 of each level L1, L2, L3, L4, respectively, the elemental thickness at each level T1, T2, T3, T4, respectively, the Reynolds number Re, the number of generations N, the Stoke's number and the like, depending on the particular use, application or objective function, for example, and should not be construed in a limiting sense. As the particular spacing $d_1$, $d_2$, $d_3$ required between each generator element depends upon the particular application, the above factors, and the like, the spacing $d_1$, $d_2$, $d_3$ can be determined by experiment, simulation, or the like for particular conditions.

Embodiments of the sparse 3D-multi-scale grid turbulence generator 10 can be used to control and/or enhance and/or optimize the mixing of and/or the momentum transfer between: fluids, heat, mass, acoustic noise, oscillations in fluids, microchip cooling, structural vibrations, chemical species, reactants, contaminants and particulates suspended in the flow, and scalar, vector and tensor fields that can be coupled to the flow. Various applications of embodiments of the sparse 3D-multi-scale grid turbulence generator 10 can also include reduction of friction in airfoils, wings and airplanes, flow meters, enhanced control of combustion in pre-mixed and diffusion flames, and enhanced catalytic mixing and control in chemical reactors, for example, and should not be construed in a limiting sense.

As noted above, the term "sparse" is used to mean that the arrangement of elements and passages cannot be space-filling, in any sense, in a full 3D volume (measured by a non-zero fractal dimension or similar mathematical quantity) due to the substantial void spaces between the substantially planar turbulence generator elements. However, it should be noted that the projection of the sparse 3D grid onto a two-dimensional (2D) plane normal to the direction of flow can be area-filling (measured by a non-zero fractal dimension or similar mathematical quantity), because the system contains turbulence elements in a substantially multi-planar configuration with substantially void space between the planes (with the possible exception of holding wires or bars, as will be described in further detail below). Further, as also indicated above, the term "non-sparse" is used herein to describe an arrangement of elements and passages that is not sparse, as defined above.

Figure 4:
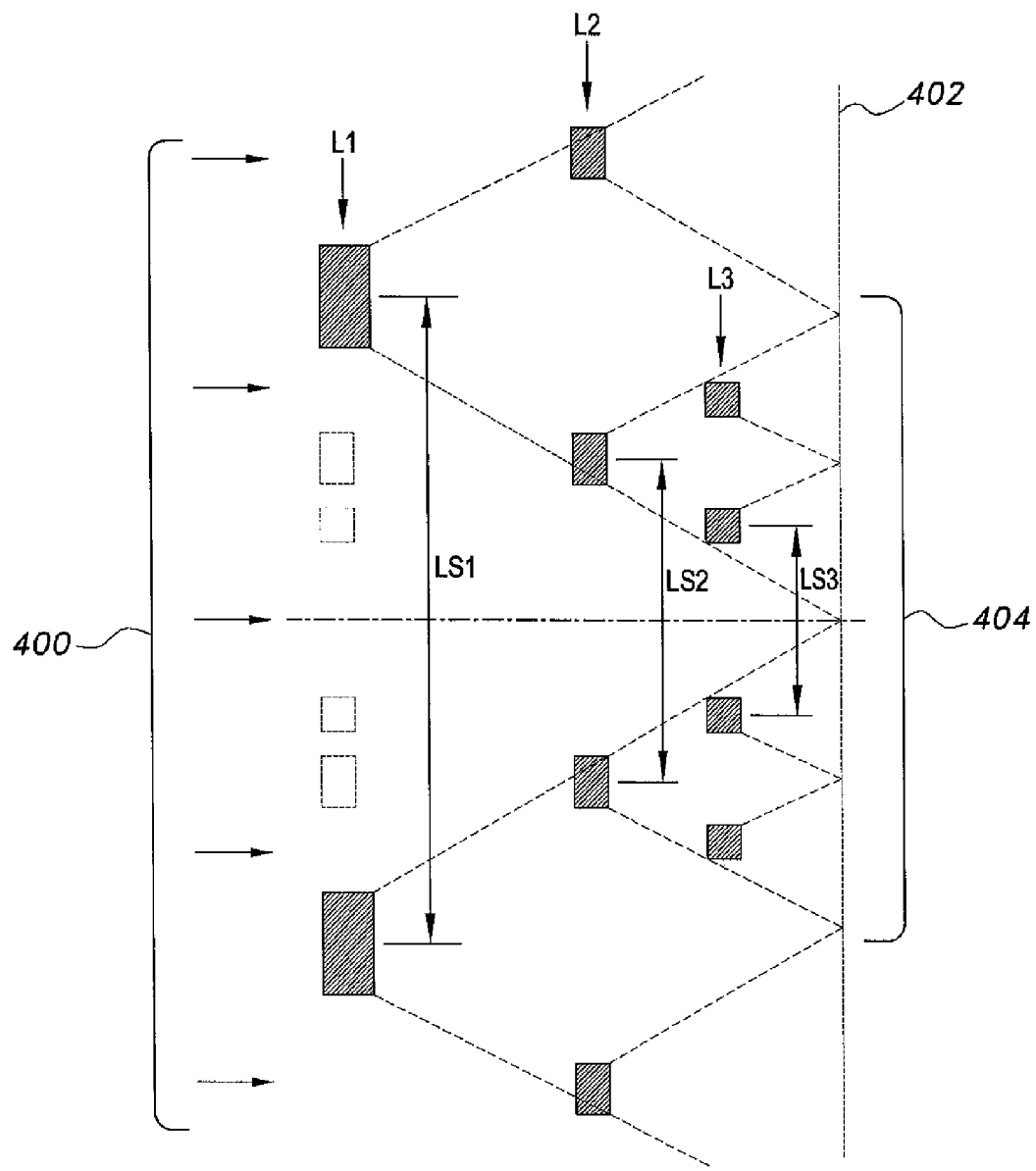
FIG. 4 is a schematic diagram illustrating an example of turbulence mixing with approximate superposition generated by the plurality of grid elements of a sparse 3D-multi-scale grid turbulence generator according to the present invention, an objective in this example being maximization of the turbulence intensity in a plane at a particular location downstream of the sparse 3D-multi-scale grid turbulence generator.

It should be understood that the successive distances $d_i$ between each generation of the grid, where i is 1, 2 or 3, for example, in the streamwise direction is not arbitrary. Rather, the $d_i$ are governed by the aim of optimizing a turbulence objective function downstream of the device. For example, the objective may be maximizing the turbulence at a particular location downstream of the device such that all generations of the grid produce a maximum turbulence intensity individually at the same location downstream. In the example of FIG. 4, laminar or turbulent flow 400 flows through the turbulence elements at levels L1, L2 and L3 (with respective length scales LS1, LS2 and LS3), so as to create turbulence at a maximum turbulence intensity plane 402, which is determined by a superposition of turbulence wake intensities 404. Thus, in this particular example, to a reasonable approximation, there is a superposition principle such that the turbulence wake intensities 404 add up to produce a maximum or a relative maximum turbulence intensity at or close to the maximum turbulence intensity plane 402. It should be understood that this is only one example of a chosen objective and should not be construed in a limiting sense.

Embodiments of the sparse 3D-multi-scale grid turbulence generator 10 are three-dimensional and sparse, in the sense described above. The effective grid blockage ratio $B_{eff}$ of the grid arrangement is typically less than that of its 2D flat counterpart (obtained by superposing the 3D sparse grid on to a single plane perpendicular to the direction of the flow), for example. It is expected that $Max(B_1, B_2, B_3, \ldots) \leq B_{eff} \leq B_F$, where $B_F$ is the grid blockage ratio of the 2D flat grid counterpart and $B_1, B_2, B_3, \ldots$ are the grid blockage ratios of the elemental grids in each respective frame 159a, 159b, 159c, 159d.

Examples of Vassilicos turbulence-generating grids are shown in U.S. Patent Publication Nos. 2010/0226202 and 2011/0080802, each of which is hereby incorporated by reference in its entirety. In contrast to a conventional Vassilicos device, embodiments of a sparse 3D-multi-scale grid turbulence generator can be configured such that each element is raised in space according to the principle of optimizing a turbulence objective function. In the example of FIG. 1, the generator is arranged as a configuration of fractally arranged turbulence generator element members disposed in a multi-planar fractal manner. Due to the arrangement of the distances (i.e., elevations) $d_i$ between each generation of turbulence generator elements, such as indicated in relation to an arrowed line "X" in FIG. 1, for example, the location of the maximum turbulence intensity is expected to be better controlled. For the same reason, the turbulence intensity in the maximum turbulence intensity plane 402, as shown in FIG. 4, downstream is expected to be maximized in such a system. Embodiments of similar 3D sparse multi-scale configurations, such as a fractal configuration, can have better mixing properties than the flat 2D counterpart device, as noted above, and also provide better control of where the mixing takes place, with lower effective grid blockage ratios.

It should be understood that the embodiment shown in FIGS. 1 and 2A and 2B exemplify one specific fractal grid that generalizes a single 2D flat grid. However, it should be understood that the particular fractal pattern is shown for exemplary purposes only, and that any 2D flat multi-scale, such as a fractal, grid turbulence generator, such as fractal cross grid 300, shown in FIG. 3, can be generalized to the embodiments of the present type of sparse 3D fractal grid turbulence generator 10. Any suitable type of multi-scale grid pattern or shape can be utilized, such as a flat circular fractal grid with circular holes or the like, depending on the use, application or objective function, and should not be construed in a limiting sense.

In FIG. 1, separate frames 159a, 159b, 159c, 159d are shown for suspending the turbulence generator elements 100a, 100b, 100c, 100d, respectively, in three dimensions, providing ease in adjustability, assembly, disassembly and portability. However, it should be understood that any suitable type of suspension for frames 159a, 159b, 159c, 159d can be utilized, such as the use of suspension wires or the like, depending on the use or application, and should not be construed in a limiting sense.

It is important to note that the 3D-multi-scale grid turbulence generator 10 is sparse; i.e., there are substantial void gaps between elemental planes in the apparatus. Such a sparse design can provide a lower effective grid blockage ratio, lower mass, easier production and replacement, lower costs and easier portability, without significant loss of performance when compared against conventional non-sparse area-filling 2D and non-sparse space-filling 3D grid turbulence generators.

As noted above, the turbulence generator elements of each level shown in FIGS. 1 and 2A and 2B are shown as squares, but it should be understood that this particular embodiment is shown for exemplary purposes only, and that the turbulence generator elements can be long tubular elements, triangular, rectangular, hexagonal, polygonal or any other suitable shape, depending on the use or application, and should not be construed in a limiting sense. Similarly, any suitable shape, contour and/or relative dimensions may be used for the flow passages formed through each turbulence generator element.

It should be further understood that embodiments of the sparse 3D-multi-scale grid turbulence generator 10 can be embedded inside a larger unit close to the point where turbulence generation, control and optimization is required. For example, in a wind tunnel or a combustor, the sparse 3D-multi-scale grid turbulence generator 10 can be positioned at the throat of the wind tunnel or the combustor unit, where the fluid or fuel mixture enters into the conduit section, i.e., where turbulence generation, mixing and control is typically most critical. It should be understood that embodiments of the sparse 3D-multi-scale grid turbulence generator 10 can be manufactured in a wide variety of sizes and contours, dependent upon the ultimate use or application, and should not be construed in a limiting sense. For example, nano-scale and micro-scale versions of embodiments of the sparse 3D-multi-scale grid turbulence generator 10 can be manufactured for application in the fields of microchips, the biological and medical fields, etc. Also, embodiments of the sparse 3D-multi-scale grid turbulence generator of a similar structure, scaled to tens of meters, can be used in industrial applications, such as combustors and chemical and catalytic reactors.

Although the sparse 3D-multi-scale grid turbulence generator 10 has void spaces between elemental planes, as noted above, it should be understood that this does not preclude the insertion of additional structural elements, such as rigid holding wires or bars, for example, in order to maintain the structural integrity of the apparatus, particularly to assist in preventing or minimizing excessive vibrations. It is therefore understood from the foregoing that any holding wire, holding bar or the like is not included in the definition of "sparse", as used here.

It should be understood that further structural elements can be added in embodiments of the sparse 3D-multi-scale grid turbulence generator without departing from the spirit or scope of the system as described above, for example, the addition of rigid inserts in the elemental planes positioned so as to block the flow of fluids at critical locations and having the effect of enhancing the mixing and/or control of the turbulence and/or optimizing the turbulence objective function. Such inserts are preferably substantially rigid, and can be manufactured from plastic, Plexiglas, aluminum or any other suitable material, for example, depending on the use or application, and should not be construed in a limiting sense.

It should be understood that in embodiments of the sparse 3D-multi-scale grid turbulence generator, the turbulence generator elements and any associated frames can be provided as part of an integral unit, or can be provided as removable elements, allowing the user to insert and adjust the turbulence generator elements as needed, for example.

It is to be understood that the present invention is not limited to the embodiments described above, but encompasses any and all embodiments within the scope of the following claims.

I claim:

1. A sparse three-dimensional multi-scale grid turbulence wake generator adapted to be disposed within a fluid flow conduit and thereby reduce the effective grid blockage ratio, comprising a set of turbulence generator elements, each of the elements having a set of fluid flow passages defined therethrough and defining an effective grid blockage ratio, the set of turbulence generator elements being positioned within the fluid flow conduit and each of the turbulence generator elements being spaced apart from adjacent ones of the turbulence generator elements, each successive one of the turbulence generator elements increasing in number and decreasing in scale the corresponding set of fluid flow passages with respect to the previous one of the turbulence generator elements so as to follow a multi-scale pattern or configuration, such that turbulence wake generation in fluid flow is selectively adjusted by all of the turbulence generator elements downstream of the set of turbulence generator elements.

2. The sparse three-dimensional multi-scale grid turbulence generator as recited in claim 1, wherein the multi-scale pattern comprises a fractal pattern or configuration.

3. The sparse three-dimensional multi-scale grid turbulence generator as recited in claim 1, further comprising at least one rail adapted for positioning in the fluid flow conduit, the set of turbulence generator elements being releasably secured to the at least one rail.

4. The sparse three-dimensional multi-scale grid turbulence generator as recited in claim 3, further comprising a plurality of bearings releasably securing the set of turbulence generator elements to the at least one rail.

5. The sparse three-dimensional multi-scale grid turbulence generator as recited in claim 3, wherein each of the turbulence generator elements is substantially rectangular.

6. The sparse three-dimensional multi-scale grid turbulence generator as recited in claim 5, wherein the at least one rail comprises four rails each of the turbulence generator elements having a corner releasably secured to a corresponding one of the rails.

7. The sparse three-dimensional multi-scale grid turbulence generator as recited in claim 1, wherein each said turbulence generator element is selectively and adjustably spaced apart from adjacent ones of the turbulence generator elements for selective active control of the turbulence generation.

8. A sparse three-dimensional multi-scale grid turbulence wake generator adapted to be disposed within a fluid flow conduit and configured to reduce the effective grid blockage ratio, comprising:
at least one rail adapted for positioning in the fluid flow conduit; and
a set of turbulence generator elements releasably secured to the at least one rail in sequence in the direction of fluid flow, each of the turbulence generator elements having a set of fluid flow passages defined therethrough and defining an effective grid blockage ratio, each successive one of the turbulence generator elements increasing in number and decreasing in scale the corresponding set of fluid flow passages defined therein with respect to the previous one of the turbulence generator elements in the direction of fluid flow so as to follow a multi-scale pattern or configuration, the set of turbulence generator elements being positioned within the fluid flow conduit, each of the turbulence generator elements being spaced apart from adjacent ones of the turbulence generator elements such that turbulence wake generation in fluid flow is selectively adjusted by all of the turbulence generator elements downstream of the set of turbulence generator elements.

9. The sparse three-dimensional multi-scale grid turbulence generator as recited in claim 8, further comprising a plurality of bearings releasably securing the set of turbulence generator elements to the at least one rail.

10. The sparse three-dimensional multi-scale grid turbulence generator as recited in claim 8, wherein each of the turbulence generator elements is substantially rectangular.

11. The sparse three-dimensional multi-scale grid turbulence generator as recited in claim 10, wherein the at least one rail comprises four rails, each of the turbulence generator elements having a corner releasably secured to a corresponding one of the rails.

12. The sparse three-dimensional multi-scale grid turbulence generator as recited in claim 8, wherein the multi-scale pattern comprises a fractal pattern or configuration.

13. The sparse three-dimensional multi-scale grid turbulence generator as recited in claim 8, wherein each said turbulence generator element is selectively and adjustably spaced apart from adjacent ones of the turbulence generator elements for selective active control of the turbulence generation.

* * * * *